United States Patent
Luo et al.

(10) Patent No.: US 11,818,626 B2
(45) Date of Patent: Nov. 14, 2023

(54) PRECISE POSITIONING SERVICES WITH AN INTERNET OF THINGS NETWORK

(71) Applicant: QUALCOMM Incorporated, San Diego, CA (US)

(72) Inventors: Ning Luo, Cupertino, CA (US); Yinghua Yang, San Jose, CA (US); Bo Zheng, Sunnyvale, CA (US); Gengsheng Zhang, Cupertino, CA (US); Han Zhang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/186,372

(22) Filed: Feb. 26, 2021

(65) Prior Publication Data

US 2022/0279311 A1  Sep. 1, 2022

(51) Int. Cl.
*H04W 4/029*     (2018.01)
*G16Y 40/10*     (2020.01)

(52) U.S. Cl.
CPC .............. *H04W 4/029* (2018.02); *G16Y 40/10* (2020.01)

(58) Field of Classification Search
None
See application file for complete search history.

(56) References Cited

U.S. PATENT DOCUMENTS

| 10,327,109 B1* | 6/2019 | Maheshwari | H04W 4/029 |
| 2020/0053638 A1* | 2/2020 | Edge | H04W 4/20 |
| 2020/0092776 A1 | 3/2020 | Edge | |

FOREIGN PATENT DOCUMENTS

| CN | 103364797 A | * | 10/2013 |
| CN | 103364797 A |   | 10/2013 |
| WO | 2013150344 A1 |   | 10/2013 |
| WO | 2018067380 A1 |   | 4/2018 |

OTHER PUBLICATIONS

International Search Report and Written Opinion—PCT/US2022/011240—ISA/EPO—dated Apr. 29, 2022.

* cited by examiner

*Primary Examiner* — Adolf Dsouza
(74) *Attorney, Agent, or Firm* — Sunstein LLP

(57) ABSTRACT

Techniques for providing positioning information to a mobile device are discussed. An example apparatus for determining a location of a mobile device includes at least one server comprising a data structure containing precise positioning subscription options associated with the mobile device, a plurality of client internet of things devices configured to communicate with the at least one server, such that at least one of the plurality of client internet of things devices is a serving internet of things device configured to provide precise positioning information to the mobile device, and such that the serving internet of things device is selected from the plurality of client internet of things devices based on the precise positioning subscription options.

44 Claims, 10 Drawing Sheets

PRECISE POSITIONING SERVICES WITH AN INTERNET OF THINGS NETWORK

BACKGROUND

The location of a mobile device, such as a cellular telephone, an Internet of Things (IoT) device, a location tracking device, or other such mobile devices including radio communication modules and motion sensors may be useful for a number of applications such as emergency calls, navigation, direction finding, asset tracking, and Internet services. The location of an IoT device may be estimated based on information gathered from various systems such as terrestrial radio transceivers, global navigation satellite system (GNSS) receivers and other sensors. The accuracy of a GNSS based system may often be below the requirements for applications such as land surveying, autonomous land and aerial vehicle navigation, or other location sensitive technologies. Some technologies such as precise point positioning (PPP) and real-time kinematic (RTK) positioning may be used to enhance the positioning accuracy of GNSS based systems. These technologies often require significant increases in processing hardware and supporting infrastructure, which may increase the costs to provide the enhanced positioning accuracy.

SUMMARY

An example of an apparatus for determining a precise location of a mobile device according to the disclosure includes at least one server comprising a data structure containing precise positioning subscription options associated with the mobile device, a plurality of client internet of things devices configured to communicate with the at least one server, wherein at least one of the plurality of client internet of things devices is a serving internet of things device configured to provide precise positioning information to the mobile device, and wherein the serving internet of things device is selected from the plurality of client internet of things devices based on the precise positioning subscription options.

Implementations of such an apparatus may include one or more of the following features. The precise positioning subscription options may include a desired accuracy of the precise positioning information. The precise positioning subscription options may include a desired update rate of the precise positioning information. The serving internet of things device may be configured to provide the precise positioning information to the at least one server, and the at least one server may be configured to provide the precise positioning information to the mobile device. The precise positioning information may be in a radio technical commission for maritime (RTCM) format. The precise positioning information may be real-time kinematic satellite phase signal correction information. The precise positioning information may be differential satellite position correction information. One or more of the plurality of client internet of things devices may be configured as hot candidates based on the precise positioning subscription options, such that a hot candidate may be configured to be a replacement serving internet of things device if the serving internet of things device becomes inactive or a distance between the mobile device and the serving internet of things device exceeds a threshold distance.

An example method for determining a serving internet of things device to provide precise positioning information to a mobile device with a network of internet of things devices according to the disclosure includes obtaining a rough position of the mobile device, determining one or more proximate reporting internet of things devices based on the rough position, selecting the serving internet of things device from the one or more proximate reporting internet of things devices based on one or more configuration options, and selecting one or more hot candidates from the one or more proximate reporting internet of things devices based on one or more configuration options.

Implementation of such a method may include one or more of the following features. The serving internet of things device may be configured to provide real-time kinematic satellite phase correction information. The serving internet of things device may be configured to provide differential satellite correction information. The one or more configuration options may include a desired accuracy of the precise positioning information. The one or more configuration options may include a desired update rate of the precise positioning information. The serving internet of things device may be configured to provide the precise positioning information in a radio technical commission for maritime (RTCM) format. The method may further include determining a status of the serving internet of things device, determining a distance between the mobile device and the serving internet of things device, and determining a replacement serving device from the one or more hot candidates if the status of the serving internet of things device is inactive or the distance between the mobile device and the serving internet of things device is above a threshold distance.

An example of an apparatus for determining a serving internet of things device to provide precise positioning information to a mobile device with a network of internet of things devices according to the disclosure includes a memory, at least one processor operably coupled to the memory and configured to obtain a rough position of the mobile device, determine one or more proximate reporting internet of things devices based on the rough position, select the serving internet of things device from the one or more proximate reporting internet of things devices based on one or more configuration options, and select one or more hot candidates from the one or more proximate reporting internet of things devices based on one or more configuration options.

An example of an apparatus for determining a serving internet of things device to provide precise positioning information to a mobile device with a network of internet of things devices according to the disclosure includes means for obtaining a rough position of the mobile device, means for determining one or more proximate reporting internet of things devices based on the rough position, means for selecting the serving internet of things device from the one or more proximate reporting internet of things devices based on one or more configuration options, and means for selecting one or more hot candidates from the one or more proximate reporting internet of things devices based on one or more configuration options.

An example of a non-transitory processor-readable storage medium comprising processor-readable instructions configured to cause one or more processors to determine a serving internet of things device to provide precise positioning information to a mobile device with a network of internet of things devices according to the disclosure includes code for obtaining a rough position of the mobile device, code for determining one or more proximate reporting internet of things devices based on the rough position, code for selecting the serving internet of things device from the one or more proximate reporting internet of things devices based on one or more configuration options, and code for selecting one or more hot candidates from the one or more proximate reporting internet of things devices based on one or more configuration options.

An example of a method for switching a serving internet of things device in an internet of things network according to the disclosure includes determining a status of the serving internet of things device, determining a distance between a mobile device and the serving internet of things device, and selecting a replacement serving internet of things device from one or more previously determined hot candidates if the status of the serving internet of things device in inactive or the distance between the mobile device and the serving internet of things device is above a threshold distance.

Implementations of such a method may include one or more of the following features. The one or more previously determined hot candidates may be selected from one or more proximate reporting internet of things devices based on one or more configuration options. The one or more proximate reporting internet of things devices may be within 10 kilometers of the mobile device. The one or more configuration options may include a desired accuracy of precise positioning information. The one or more configuration options may include a desired update rate of precise positioning information.

An example of an apparatus for switching a serving internet of things device in an internet of things network according to the disclosure includes a memory, at least one processor operably coupled to the memory and configured to determine a status of the serving internet of things device, determine a distance between a mobile device and the serving internet of things device, and select a replacement serving internet of things device from one or more previously determined hot candidates if the status of the serving internet of things device in inactive or the distance between the mobile device and the serving internet of things device is above a threshold distance.

Implementations of such an apparatus may include one or more of the following features. The one or more previously determined hot candidates may be selected from one or more proximate reporting internet of things devices based on one or more configuration options. The one or more proximate reporting internet of things devices may be within 10 kilometers of the mobile device. The one or more configuration options may include a desired accuracy of precise positioning information. The one or more configuration options may include a desired update rate of precise positioning information.

An example of an apparatus for switching a serving internet of things device in an internet of things network according to the disclosure includes means for determining a status of the serving internet of things device, means for determining a distance between a mobile device and the serving internet of things device, and means for selecting a replacement serving internet of things device from one or more previously determined hot candidates if the status of the serving internet of things device in inactive or the distance between the mobile device and the serving internet of things device is above a threshold distance.

An example of a non-transitory processor-readable storage medium comprising processor-readable instructions configured to cause one or more processors to switch a serving internet of things device in an internet of things network according to the disclosure includes code for determining a status of the serving internet of things device, code for determining a distance between a mobile device and the serving internet of things device, and code for selecting a replacement serving internet of things device from one or more previously determined hot candidates if the status of the serving internet of things device in inactive or the distance between the mobile device and the serving internet of things device is above a threshold distance.

Items and/or techniques described herein may provide one or more of the following capabilities, as well as other capabilities not mentioned. An Internet of Things (IoT) device may be configured to determine its precise position based on satellite signals in combination with other precise positioning services, such as precise point positioning data, real-time kinematic data, and differential GNSS data. The IoT device with a precisely known position may be used as a reference station to provide position correction data to a network of IoT devices or other precise positioning applications. Other IoT devices may receive customizable position correction data based on application requirements. The status of IoT references stations in the network may be monitored. Hot candidate IoT devices may be identified to act as reference stations if a current reference station becomes unavailable. A user device may receive position correction data from different IoT reference stations. A reliable and expandable precise positioning network may be realized. Further, it may be possible for an effect noted above to be achieved by means other than that noted, and a noted item/technique may not necessarily yield the noted effect.

DETAILED DESCRIPTION

Figure 1:
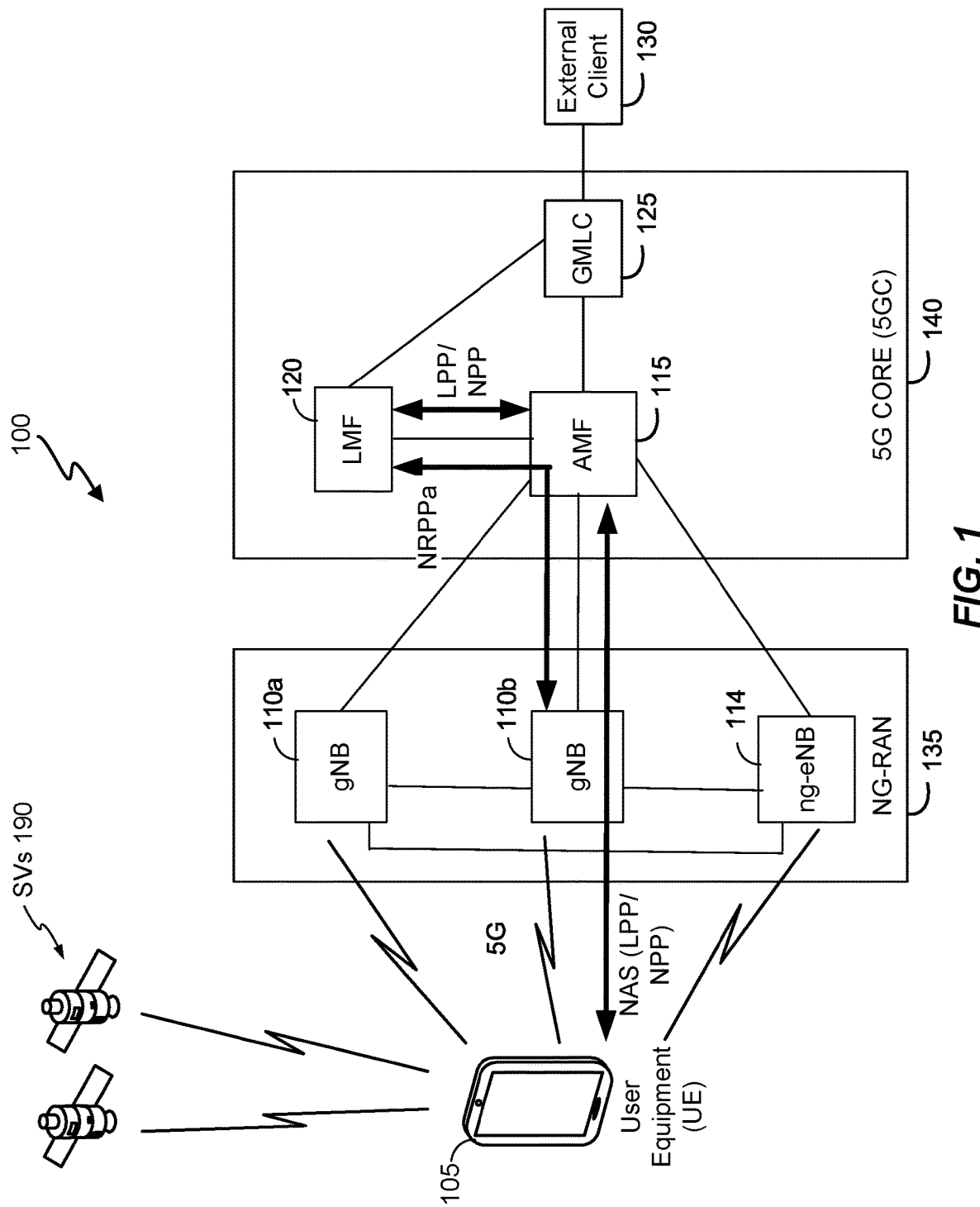
FIG. 1 is a diagram of an example communication system.

Techniques are discussed herein for providing precise positioning information to a mobile device with a dynamic Internet of Things (IoT) network. Precise Positioning Services (PPS) usually refers to sub-meter to centimeter level accuracy positioning services, such as Differential GNSS (DGNSS), Precise Point Positioning (PPP), and Real-Time Kinematic (RTK) methods. These solutions typically require substantial investments in additional hardware and advanced GNSS software packages. The methods described herein utilize dense and dynamic IoT networks to provide low-cost and reliable PPS without building dedicated infrastructures and deploying complicated GNSS software packages. In an example, an IoT network may contain several IoT devices that are each capable of utilizing GNSS data to determine a location, and to communicate with other devices and/or a network via one or more wireless communication protocols. The IoT devices may be configured to report GNSS measurements back to a network server for crowdsourcing or performance enhancement. An IoT device with a precisely known position can be configured as a reference station to provide single-station RTK/DGNSS corrections for precise positioning applications, such as autonomous driving, HD mapping, etc. Additional IoT devices may be added to the proposed IoT network to expand the PPS coverage. The density of IoT devices in the network may be used to update and change which IoT device is acting as an RTK reference station. When the status of such an IoT RTK reference station changes (e.g., loss of power, loss of position accuracy, etc.), another qualified IoT device may provide the functionality of the RTK reference station. The number and variety of IoT devices in the network may be used to enable of a range of customizable services. For example, a user may select a desired level of positional accuracy (e.g., sub-meter, decimeter, centimeter), as well as other associated parameters such as desired GNSS constellation(s), signal band(s), correction type, data payload format, and correction data update frequency. These techniques are examples, and not exhaustive.

In general, DGNSS such as DGPS utilizes code-based positioning for determining a location of a GPS receiver. For example, a GPS signal from a satellite transmits Pseudo Random Code (PRC), and a GPS receiver is configured to receive the PRC from multiple satellites. The receiver is configured to align the received code to its own and calculate the propagation delay. The GPS receiver also knows the position of the satellite and can calculate the distance to the satellite. Once the receiver knows its distance (range) from four satellites, for example, it may determine its 3-dimensional position.

RTK systems utilize carrier-based ranging to determine position information. For example, a range may be calculated by determining the number of carrier cycles between the RTK receiver and satellite and then multiplied by the wavelength of the carrier signal. Since different GPS satellites may transmit different frequencies, the errors of atmospheric delays and multi-path propagation of the satellite signals may be reduced.

DGNSS and RTK may use a base station with a known position (e.g., based on a precise positioning service). The base station of the DGNSS system may be configured to compare its known position with the position calculated by the GNSS signal. The differences between known and calculated positions are then transmitted to other receivers in a network, which use the correction to calculate their respective positions. The base station in a RTK system may be configured to transmit the phase of the signal that it observes and send that information to the other receivers in a network, which then compare the information to the phase that they observe.

Referring to FIG. 1, a diagram of an example communication system 100 is shown. The communication system 100 comprises a mobile device (e.g., an IoT device, location tracker device, cellular telephone, or other user equipment (UE)) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC).

Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The communication system 100 may utilize information from satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and next generation eNodeB (ng-eNB) 114, and the 5GC 140 includes an Access and Mobility Management Function (AMF) 115, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the LMF 120, and the GMLC 125 are communicatively coupled to each other, and the GMLC is communicatively coupled to an external client 130.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs 190, gNBs 110a-b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UNITS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a-b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
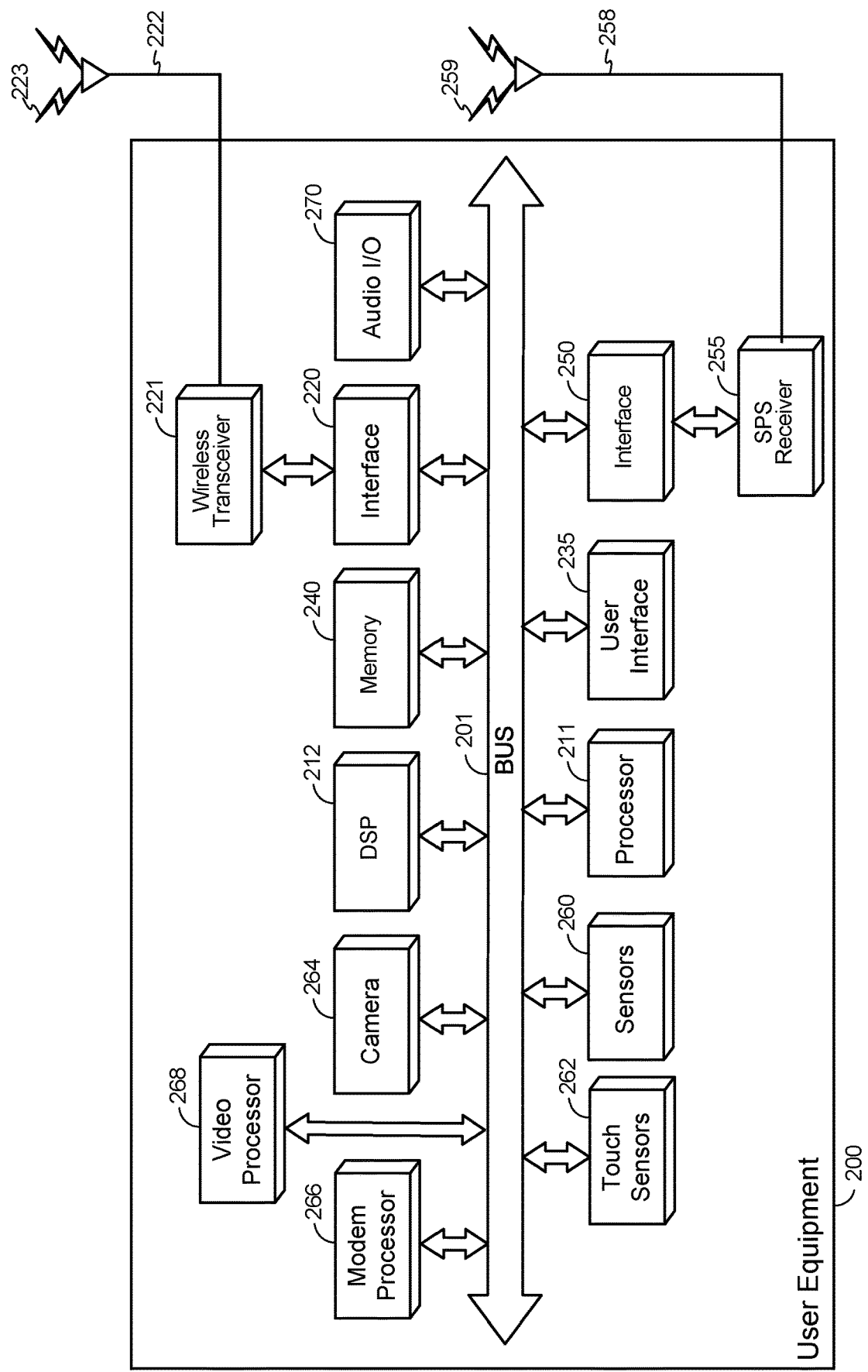
FIG. 2 is a schematic diagram of a mobile device.

Referring to FIG. 2, a schematic diagram of a mobile device 200 according to an embodiment is shown. The UE 105 as shown in FIG. 1 may comprise one or more features of the mobile device 200 shown in FIG. 2. Some of the features disclosed in FIG. 2 are optional. In certain embodiments, the mobile device 200 may comprise a wireless transceiver 221 which is capable of transmitting and receiving wireless signals 223 via a wireless antenna 222 over a wireless communication network. A wireless transceiver 221 may be connected to a bus 201 by a wireless transceiver bus interface 220. The wireless transceiver bus interface 220 may, in some embodiments, be at least partially integrated with the wireless transceiver 221. Some embodiments may include multiple wireless transceivers 221 and wireless antennas 222 to enable transmitting and/or receiving signals according to corresponding multiple wireless communication standards such as, for example, versions of IEEE Standard 202.11, CDMA, WCDMA, LTE, UMTS, GSM, AMPS, Zigbee, Bluetooth®, and a 5G or NR radio interface defined by 3GPP, just to name a few examples. In a particular implementation, the wireless transceiver 221 may receive and acquire a downlink signal comprising a terrestrial positioning signal such as a PRS. For example, the wireless transceiver 221 may process an acquired terrestrial positioning signal sufficiently to enable detection of timing of the acquired terrestrial positioning signal.

The mobile device 200 may comprise an SPS receiver 255 capable of receiving and acquiring SPS signals 259 via an SPS antenna 258 (which may be the same as the antenna 222 in some embodiments). The SPS receiver 255 and interface 250 may process, in whole or in part, the acquired SPS signals 259 for estimating a location of the mobile device 200. One or more general-purpose processor(s) 211, a memory 240, one or more digital signal processor(s) (DSP(s)) 212, and/or specialized processors (not shown) may be utilized to process acquired SPS signals, in whole or in part, and/or to calculate an estimated location of the mobile device 200, in conjunction with the SPS receiver 255. Storage of SPS, TPS or other signals (e.g., signals acquired from the wireless transceiver 221) or storage of measurements of these signals for use in performing positioning operations may be performed in the memory 240 or registers (not shown). The general-purpose processor(s) 211, the memory 240, the DSP(s) 212, and/or specialized processors may provide or support a location engine for use in processing measurements to estimate a location of the mobile device 200. For example, the general-purpose processor(s) 211 or the DSP(s) 212 may process a downlink signal acquired by the wireless transceiver 221 to, for example, make measurements of RSSI, RTT, AOA, TOA, RSTD, RSRQ and/or RSRQ.

Also shown in FIG. 2, the DSP(s) 212 and the general-purpose processor(s) 211 may be connected to the memory 240 through bus the 201. A particular bus interface (not shown) may be integrated with the DSP(s) 212, the general-purpose processor(s) 211, and the memory 240. In various embodiments, functions may be performed in response to execution of one or more machine-readable instructions stored in the memory 240 such as on a computer-readable storage medium, such as RANI, ROM, FLASH, or disc drive, just to name a few examples. The one or more instructions may be executable by the general-purpose processor(s) 211, specialized processors, or the DSP(s) 212. The memory 240 may comprise a non-transitory, processor-readable memory and/or a computer-readable memory that stores software code (programming code, instructions, etc.) that are executable by the processor(s) 211 and/or the DSP(s) 212 to perform functions described herein.

Also shown in FIG. 2, a user interface 235 may comprise any one of several devices such as, for example, a speaker, microphone, display device, vibration device, keyboard, touch screen, just to name a few examples. In a particular implementation, the user interface 235 may enable a user to interact with one or more applications hosted on the mobile device 200. For example, devices of the user interface 235 may store analog and/or digital signals on the memory 240 to be further processed by the DSP(s) 212 or the general purpose processor 211 in response to action from a user. Similarly, applications hosted on the mobile device 200 may store analog or digital signals on the memory 240 to present an output signal to a user. The mobile device 200 may optionally include a dedicated audio input/output (I/O) device 270 comprising, for example, a dedicated speaker, microphone, digital to analog circuitry, analog to digital circuitry, amplifiers and/or gain control. This is merely an example of how an audio I/O may be implemented in a mobile device, and claimed subject matter is not limited in this respect. The mobile device 200 may comprise touch sensors 262 responsive to touching or pressure on a keyboard or touch screen device.

The mobile device 200 may comprise a dedicated camera device 264 for capturing still or moving imagery. The camera device 264 may comprise, for example, an imaging sensor (e.g., charge coupled device or CMOS imager), lens, analog-to-digital circuitry, frame buffers, just to name a few examples. Additional processing, conditioning, encoding, and/or compression of signals representing captured images may be performed at the general purpose/application processor 211 and/or the DSP(s) 212. A dedicated video processor 268 may perform conditioning, encoding, compression or manipulation of signals representing captured images. A video processor 268 may decode/decompress stored image data for presentation on a display device (not shown) on the mobile device 200.

The mobile device 200 may also comprise sensors 260 coupled to the bus 201 which may include, for example, inertial sensors and environment sensors. Inertial sensors of the sensors 260 may comprise, for example, accelerometers (e.g., collectively responding to acceleration of the mobile device 200 in three dimensions), one or more gyroscopes or one or more magnetometers (e.g., to support one or more compass applications). Environment sensors of the mobile device 200 may comprise, for example, temperature sensors, barometric pressure sensors, ambient light sensors, camera imagers, microphones, just to name few examples. The sensors 260 may generate analog and/or digital signals that may be stored in the memory 240 and processed by the DPS(s) 212 or the general purpose application processor 211 in support of one or more applications such as, for example, applications directed to positioning or navigation operations.

The mobile device 200 may comprise a dedicated modem processor 266 capable of performing baseband processing of signals received and downconverted at the wireless transceiver 221 or the SPS receiver 255. The modem processor 266 may perform baseband processing of signals to be upconverted for transmission by the wireless transceiver 221. In alternative implementations, instead of having a dedicated modem processor, baseband processing may be performed by a general purpose processor or DSP (e.g., the general purpose/application processor 211 or the DSP(s) 212). These are merely examples of structures that may perform baseband processing, and claimed subject matter is not limited in this respect.

Figure 3:
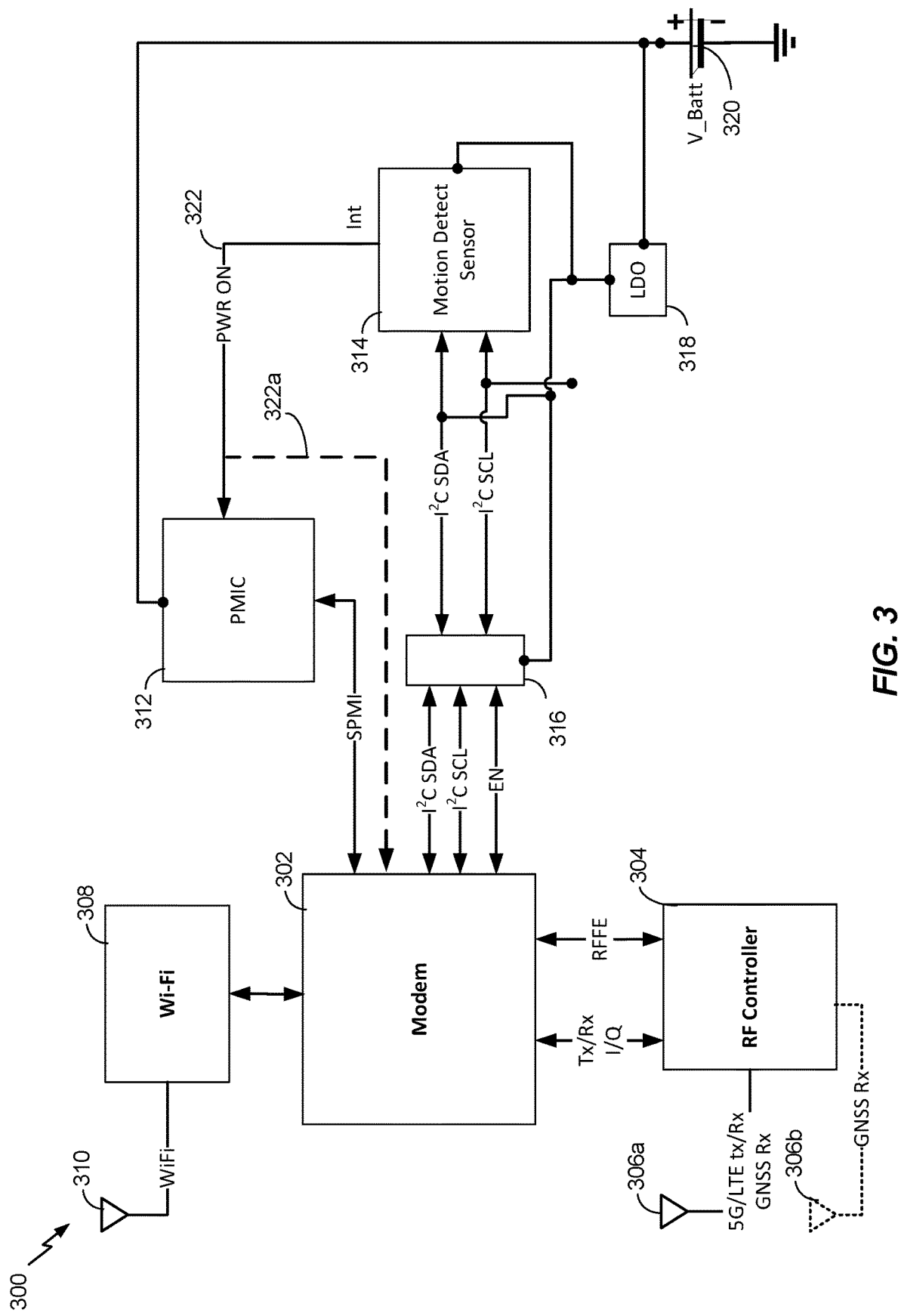
FIG. 3 is a hardware diagram for a subset of components in an example Internet of Things (IoT) device.

Referring to FIG. 3, a hardware diagram for an example IoT device 300 is shown. The IoT device is an example of type of mobile device 200. In general, and IoT device has the ability to connect with the internet and includes integrated technology such as sensors, functional software, technology to support networks connection, or actuators. As examples, and not limitations, IoT devices can be a myriad of products such as mobile devices, light actuators, parking meters, appliances, security systems, fire alarms, cameras, and more. In an example, the IoT device 300 may include a modem module 302, an Radio Frequency (RF) control module 304, an optional Wi-Fi module 308, a power management integrated circuit (PMIC) 312, and an external motion detect sensor 314. The modem module 302 may also be a device manager, and is an example of a modem processor 266 including at least one central processing unit (e.g., ARM Cortex A7), and configured as a multi-mode single chipset connectivity solution to support IoT applications such as asset trackers, health monitors, security systems, smart city sensors, smart meters, wearable trackers and other portable or moveable device utilizing wide-area connectivity in a small form factor and low-power requirements. In an example, the modem module 302 may be a Qualcomm 9205 chipset configured for voice services such as LTE Cat-M1 VoLTE over IMD, GSM CS voice, and advanced capabilities such as Cat-M1 with 2,984 max. UL TBS Rel. 14, Cat-M1 VoL enhancements, Cat-NB2 with multi-carrier NPRACH and Paging, Cat-M1 coverage enhancements Mode B support, Cat-M1 with enhanced coverage restriction, Cat-M1 w/HARQ-ACK bundling in HD-FDD mode, Cat-NB2 with larger TBS and 2 HARQ processes, Cat-M1 retuning to another narrowband region within 1 retuning symbol, Cat-NB2 Release Assistance Indication (RAI). The RF control module 304 is an example of a wireless transceiver 221 and s SPS receiver 255. The RF control module 304 may be software defined radio operably coupled to the modem module 302 and one or more antennas 306a, 306b. A radio frequency reference input (RFFE) and Tx/Rx I/Q channels may be utilized between the modem module 302 and the RF control module 304. The RF control module 304 may be configured for various cellular technologies such as, for example, Rel. 12 EGPRS MSC12, Rel. 14 LTE Cat-M1, Rel. 14 LTE and Cat-NB2. As an example, and not a limitation, the modem module 302 and the RF control module 304 may support network protocols such as IPv4/IPv6 stack with TCP and UDP, PPP, SSL, DTSL, FTP, ping, HTTTP, MQTT, OMA Lightweight M2M, CoAP. The RF control module 304 may be configured to support terrestrial and satellite based positioning. For example, the RF control module 304 may be configured to receive GPS, GLONASS, Beidou, and Galileo satellite signals as well as cellular signals used in terrestrial navigation (e.g., measurement of RSSI, RTT, RSRP, RSRQ, TOA signals). In an example, the RF control module 304 may be a radio transceiver and front-end IC such as the Qualcomm SDR105.

In an example, the subset of components may include an optional Wi-Fi module 308. The Wi-Fi module 308 is an example of a wireless transceiver 221. The Wi-Fi module 308 may be operably coupled to the modem module 302 and an antenna 310, and configured for single or dual-band connectivity for both 2.4 GHz and 5 Ghz applications. In an example, the Wi-Fi module 308 may be a Qualcomm QCA4002/4 for IoT applications. A power supply 320 and voltage regulator (e.g., low-drop out LDO regulator 318) may be used with resistor networks (not shown in FIG. 3) to provide power and biasing voltages to the hardware components. In an example, the power supply is in a range of 2.4V to 4.8V.

While the hardware components depicted in FIG. 3 are shown as discrete packages, more than one component may be integrated in a System On Chip (SoC) configuration. For example the Qualcomm 9205 LTE Modem may include the Qualcomm 9205 baseband IC, the SMB231 charger IC, the PME9205 power management IC, and the SDR105: radio transceiver and front-end IC in a SoC configuration. Further, more than one external motion detect sensor device may be used.

Other devices and chip sets may also be used in IoT networks. For example, an IoT device may include the ublox ZED-F9P module configured for concurrent reception of GPS, GLONASS, Galileo and BeiDou and capable of multiband RTK. The specific hardware device manufacturers and part numbers provided herein are examples, and not limitations, as the functionality of the components may be included in other proprietary and commercially available semiconductor chips sets.

Figure 4:
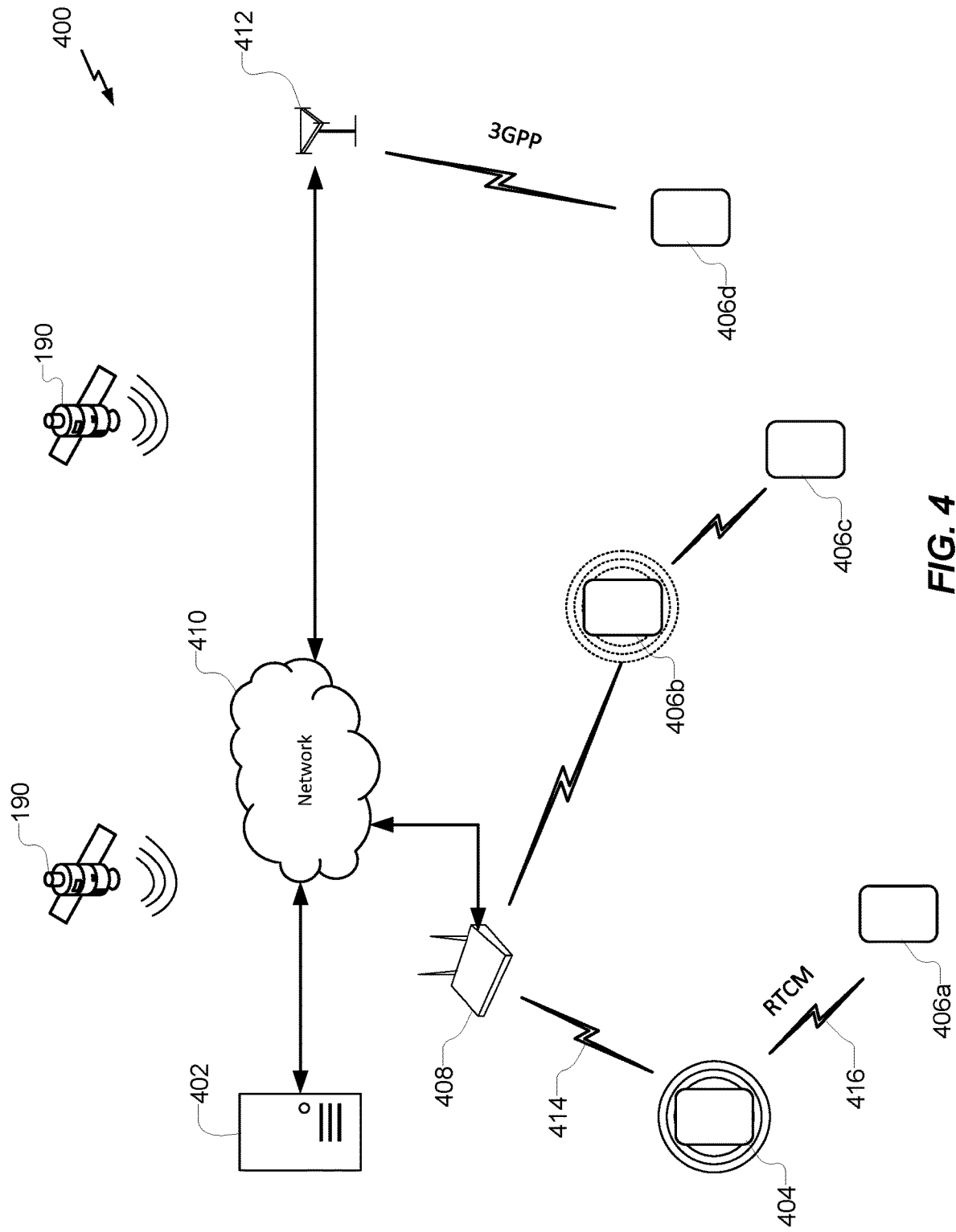
FIG. 4 is a conceptual diagram of an example IoT architecture for providing precise positioning services.

Referring to FIG. 4, with further reference to FIGS. 1-3, an example IoT architecture 400 for providing precise positioning services is shown. The architecture 400 includes a server 402 operably connected to a network 410. The server 402 may be one or more edge network devices configured to coordinate the communications between the network elements. The network 410 may include the communication system 100 and/or other wide area network components. In an example, the server 402 may be included in the communication system 100 (e.g., the LMF 120). The architecture 400 includes an example access point 408 and an example base station 412. The access point 408 and base station 412 are examples of a WiFi access point, a gNB 110a-b, a ng-eNB 114 or other networked wireless communication stations. In an example, the network 410 may include a connection to the Internet. A serving IoT device 404 may be an IoT device with a precise location (indicated as solid concentric circles in FIG. 4). Typically, the serving IoT device 404 may be a stationary IoT device such as a lamp post, weather station, security camera, or any capable IoT device in a fixed location. In an example, the serving device may be a Roadside Unit (RSU) in a V2X network. The serving IoT device 404 is not limited to stationary units. Mobile devices with precise point positioning may be configured as a serving device and thus capable of propagating the position accuracy to other IoT devices in the network. For example, the serving IoT device 404 may be a mobile device operating with a subscription to a position correction service (e.g., PPP, DGNSS, Network RTK).

In general, errors in satellite clocks, real orbits, and other sources may contribute to inaccuracies to GNSS signals by the time they reach a receiver. In an example, the serving IoT device 404 is configured to transmit its known position and raw GNSS measurements to other IoT devices in the network. A user device may be configured to compute a difference between a truth range (i.e., the known position of the serving IoT device 404) and the raw measurements obtained by the serving IoT device 404 to obtain corrections for a satellite. In another example, the serving IoT device 404 may be configured to utilize the signals transmitted from the GNSS satellites 190 to calculate its position and compare that calculated position to its actual known position. The difference in the positions is used to determine error corrections, which are then provided to other IoT devices in the network. The error corrections are example of precise positioning information and may be real-time kinematic satellite phase correction information or differential satellite correction information. In an example, the serving IoT device 404 may utilize a wireless sidelink 416 to provide the correction data to a first IoT device 406a. The wireless sidelink may be Bluetooth, PC5, or other wireless communication technology. The correction data may be included as a RTCM protocol compatible payload (Radio Technical Commission for Maritime). Other protocols (e.g., 3GPP, etc.) may also be used. The first IoT device 406a may utilized the signals transmitted from the GNSS satellites 190 and the correction data received from the serving IoT device 404 to compute a precise position.

In an example, the serving IoT device 404 may utilize additional wireless protocols 414 (e.g., WiFi, LTE, 5G) to provide precise positioning data to the server 402 via the access point 408 or the base station 412. The server 402 is configured to enable the propagation of the precise positioning data determined by the serving IoT device 404 throughout the network. For example, a second IoT device 406b may receive the precise positioning data via the network 410 and the access point 408 (or another access point connected to the network 410) and apply the precise positioning data to the signals received from the satellites 190 to determine a precise position. The second IoT device 406b may then utilize its precise position to generate new precise positioning data and provide that precise positioning data to the server 402 or to one or more other IoT devices in the network, such as a third IoT device 406c. The precise positioning data may be provided to the third IoT device 406c via a sidelink or other peer-to-peer communication protocol. In an example, the second IoT device 406b may be configured to forward the precise positioning data received from the network 410 to the third IoT device 406c.

The various IoT devices in the network may be configured to provide precise positioning data based on their respective capabilities or configuration set points. For example, the first IoT device 404 may provide precise positioning data to the server 402 at a first accuracy level and at a first rate, and the second IoT device 406b may provide precise positioning data to the server 402 at a second accuracy level and at a second rate. A fourth IoT device 406d may be configured to customize how precise positioning data is received from the server 402. For example, the fourth IoT device 406d may subscribe to obtain data at the first accuracy level at the first rate. Other configuration options may also be used.

Figure 5:
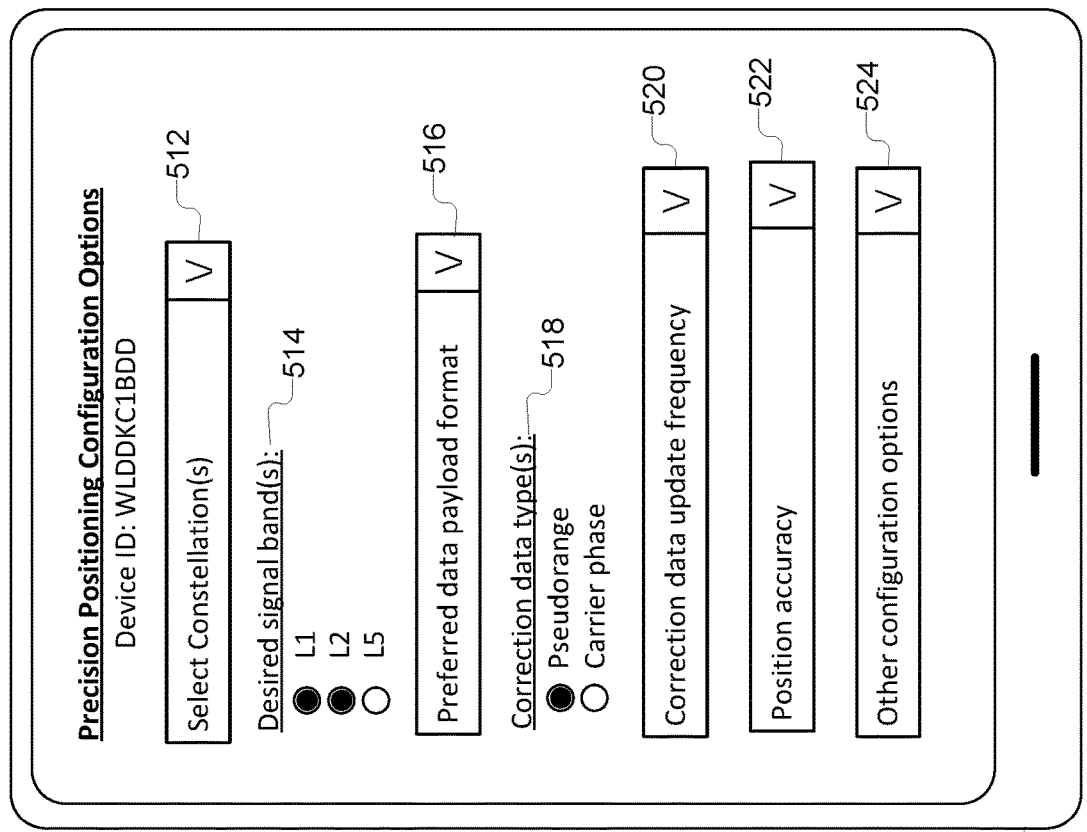
FIG. 5 is an example user interface and data structure of customizable subscription service for precise positioning with an internet of things network.
Figure 5:
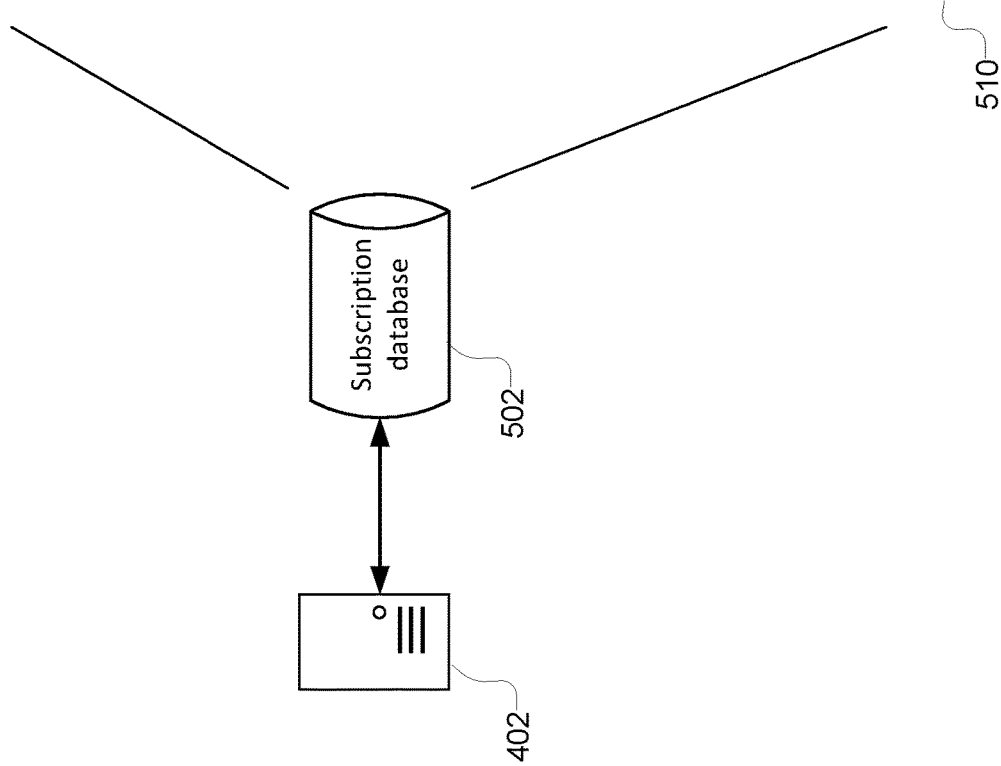

Referring to FIG. 5, with further reference to FIGS. 1-4, an example user interface and data structure of a customizable subscription service for precise positioning with an IoT device is shown. The server 402 may include, or be operably coupled to, a data structure 502 configured to store subscription database information. The data structure 502 may be a relational database application (e.g., SQL, Oracle, etc.), or other persistent data structures (e.g., flat files, JSON, XML) configured to store user and device subscription information. The data structure 502 may include various tables and fields configured to store the user and/or device subscription options. Prior precise positioning services typically have a single service model where all subscribers receive the same level of data. The prior art models may be inefficient for some users because the received positioning data may be at an accuracy level that is higher than the user requires and thus a portion of the cost of the subscription is wasted. The data structure 502 is configured to store precise positioning subscription options to enable a user to receive customized position information that is better suited for a particular application. In an example, a computing device 510 such as a tablet, personal computer, etc., may be configured to present a user with configuration selections, which are stored in the data structure 502. For example, the user interface may be a web based application configured to execute in a browser or a rich client application executing on the computing device 510. In an example, the data structure 502 may persist on the computing device 510. The user interface may include standard objects such as text boxes, list boxes, combination boxes, radio buttons, toggle objects, and other input and display objects.

The subscription options may be associated with a user (e.g. userID) or other identifying information such as a Device ID. The subscription options may also be associated with a location or region. The options may include data fields associated with relevant satellite signal types. For example, a select constellations field 512 may be configured to obtain a list of the GNSS constellation data that the device is configured to receive (e.g., GPS, GLONASS, Galileo, Beidou, etc.). A desired band field 514 is configured to obtain information associated with satellite signal types such as L1C/A, L2C, L20F, E1B/C, B2I, E5b, L5, etc. Other fields may be used to capture channel information (e.g., pilot or data). A payload format field 516 may be used to store the expected format of received correction data (e.g., RTCM, 3GPP, etc.). A correction data type field 518 may receive indications of a desire to utilize pseudorange and/or carrier phase corrections. A correction data update frequency field 520 may be used to receive the user's desired correction data update frequency (e.g. every 1, 2, 5, 10, 15, etc. seconds). A position accuracy field 522 may indicate the desired accuracy of the correction data (e.g., centimeter-level, decimeter-level, sub-meter level, etc.). Other configuration options 524 and operational data may be stored in the data structure 502. For example, the rough location of the device may be periodically provided to the server (e.g., lat/long/alt). A corresponding position uncertainty may also be stored (e.g., East, North, Vertical: meters). Other satellite and positioning options which may impact the delivery of precise positioning services may also be stored in the data structure 502.

In an example, the data structure 502 or the server 402 may have a billing application configured to provide billing or purchase order information to users. The users may enter subscription options based on a fee structure. For example, the fee structure may be based on geographic regions, correction data update frequency, position accuracy, or other configuration options. A user may be billed periodically and/or per use, or based on other commercial approaches, for the precise positioning services provided by the network 400. One of the configuration options may include an opt-out option for a user to cancel their subscription. In an embodiment, devices in the network 400, such as the serving IoT device 404, may be compensated for participating in the network 400. In one example, to encourage participation in the network 400, the compensation may be based on the amount of time a device performs as a serving station. Other compensation approaches may be used to provide a benefit to add devices into the network.

Figure 6:
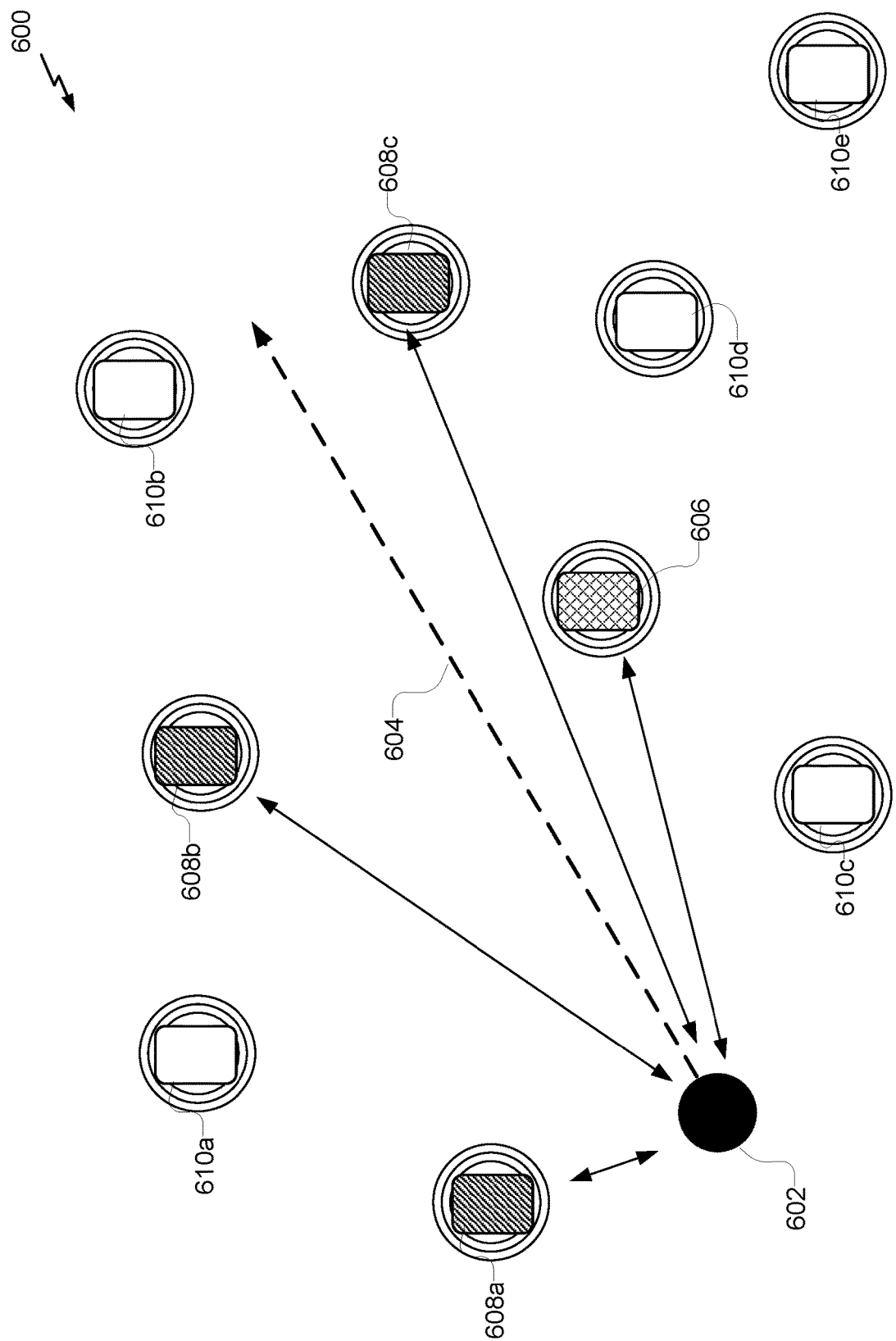
FIG. 6 is an example use case diagram of positioning a mobile device with a network of IoT devices.

Referring to FIG. 6, with further reference to FIGS. 1-6, an example use case diagram of positioning a mobile device 602 with a network 600 of IoT devices is shown. In an example, the network 600 includes the example IoT architecture 400 in FIG. 4. The devices depicted in the network 600 are configured to receive signals from the satellites 190 and communicate with the server 402, via the access point 408 and/or base station 412 (not depicted in FIG. 6) as previously described. The communications technologies between the devices in the network 600 are agnostic as various wired and wireless communications systems may be used to enable the transfer of data between the devices. The mobile device 602 is an example of a UE 105. For example, the mobile device 602 may be an autonomous vehicle such as a delivery drone. The server 402 is configured to determine subscription data associate with the mobile device 602 (e.g., based on a Device ID, user ID or other index field). The subscription data may be further based on the location of the mobile device 602. The server 402 is configured to obtain the current location (e.g., rough location) of the mobile device 602 and determine one or more IoT devices in the network 600 to provide precise positioning information (e.g., RTK, DGPS correction data) to the mobile device 602 based on the subscription options. The network 600 may include a plurality of client IoT devices with one IoT device designated as a serving IoT device. For example, the server 402 may select a serving IoT device 606 based on one or more previously saved subscription fields, such as the position accuracy field 522 and constellation field 512. The serving IoT device 606 may be a stationary or mobile IoT device with a precise location. The serving IoT device 606 may be configured to determine RTK or DGPS correction data, and provide the correction data (i.e., precise positioning information) to the server 402. In an example, the server 402 may receive raw satellite signal information from the serving IoT device 606 and compute the precise positioning data. The mobile device 602 may receive the precise positioning data from the server 402 (e.g., via the architecture 400) or directly from the serving IoT device 606 (e.g., via a sidelink protocol) and compute a precise position. In an example, the server 402 may be configured to receive the satellite signal information from the mobile device 602 and from the serving IoT device 606 to determine a precise location of the mobile device 602.

The server 402 may also determine one or more hot candidates 608a-c based on the location and subscription configuration of the mobile device 602. The hot candidates 608a-c are client IoT devices that may be used as alternate serving IoT devices. The selection of the hot candidates 608a-c may be based on the projected future trajectory 604 of the mobile device, and/or other subscription factors. The server 402 may evaluate the subscription options based on a weighted matching algorithm such that a selected serving IoT device 606 may represent a best result based on the matching algorithm. The hot candidates 608a-c may then represent the next best results based on the weighting algorithm. For example, the subscription options may indicate a desired decimeter accuracy requirement with correction data to be provided every 5 seconds. The serving IoT device 606 may provide decimeter accuracy at the desired update rate. A first hot candidate 608a may be configured to provide a centimeter level accuracy at a higher update rate. The first hot candidate 608a is thus capable of over providing services which may be suboptimal from a data transfer perspective, but would be a sufficient replacement serving station for the mobile device 602 should the serving IoT device 606 become inactive. Alternatively, a second hot candidate 608b may provide the required accuracy and update rate, but other factors such as uptime or other historical performance factors are used to categorize it as a hot candidate rather than the serving device. A third hot candidate 608c may also meet the accuracy and update rate, but its relative position to the mobile device 602 as compared to the serving IoT device 606 is used to classify it as a hot candidate. The server 402 may be configured to modify the precise positioning data sent to the mobile device 602 based on the subscription requirements. For example, the server 402 may filter the data associated with the over providing first hot candidate 608a to meet the subscription expectations of the mobile device 602. The server 402 may also modify the format of the data payloads between devices such as converting RTCM messages to 3GPP frames, and vice versa as indicated by the subscription options.

The server 402 is configured to continually update the selections of the current serving device and hot candidates as the mobile device 602 proceeds along the trajectory 604. One or more unassigned client IoT devices 610a-e may subsequently be selected as a serving device and/or hot candidate based on the subscription options and the network status. For example, if the current serving IoT device 606 and/or one of the hot candidates 608a-c should become inactive for reasons such as going off-line (e.g., power save mode, communication failure), or losing position accuracy (e.g., due to an obstructed sky view), or changing location, or other device failure, the server 402 is configured to execute the matching algorithms to find alternate stations to use. Thus, the IoT network 600 provides increased reliability as compared to prior single station RTK solutions because alternate serving devices are identified and may be used to immediately replace a failed serving device. The matching algorithms may also continually reevaluate the status and capabilities of the devices in the IoT network 600 to provide the services that are aligned with the subscription options. New IoT stations may also be added to the network. Thus, the coverage area of the precise positioning services may be expanded automatically as the number of IoT devices in the network grows. In an example, the mobile device 602 itself may be included into the IoT network and may be configured as a serving device. The server 402 may be configured to use the existing network 600 to precisely determine the positions of the newly added IoT devices. In an example, one or more of the unassigned client IoT devices 610a-e may be in a sleep mode and the server 402 may be configured to wake an unassigned client IoT device 610a-e so that it may function as a hot candidate or a serving device.

Figure 7:
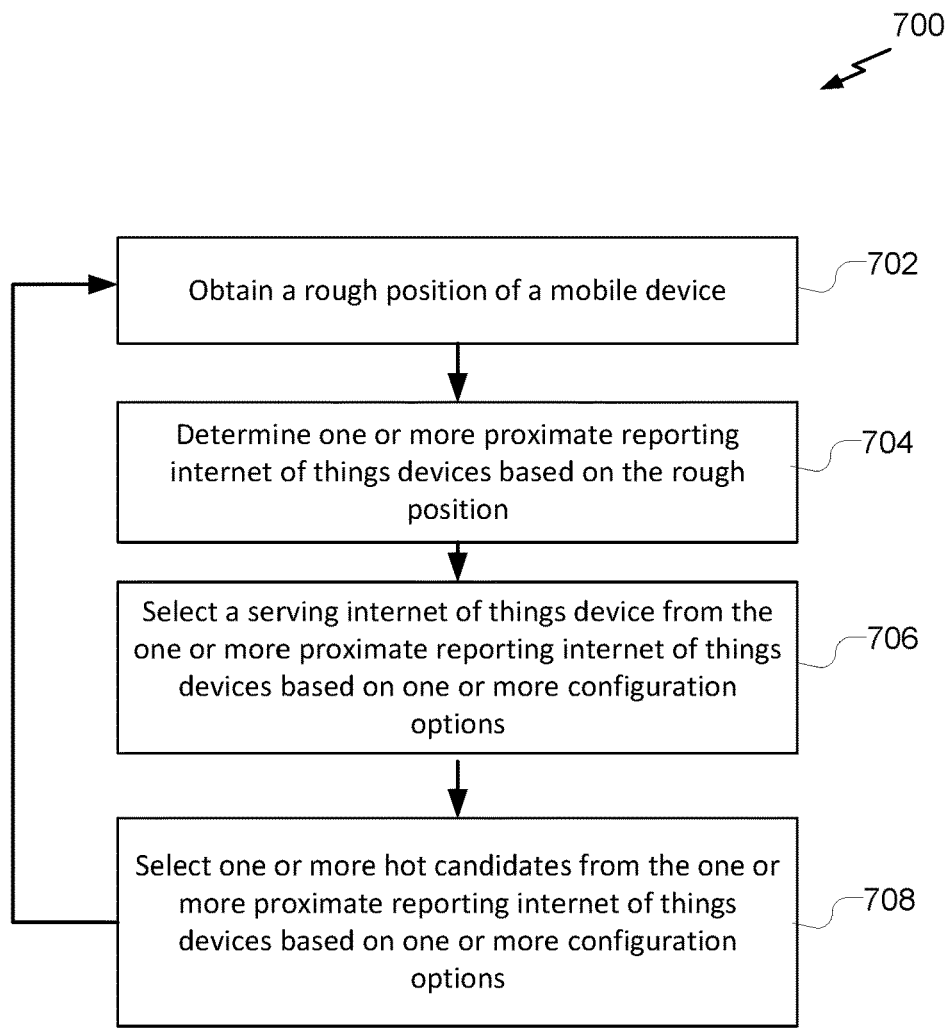
FIG. 7 is a flowchart of an example procedure for determining a serving internet of things device to provide precise positioning information to a mobile device with a network of internet of things devices.

Referring to FIG. 7, with further reference to FIGS. 1-6, a method 700 for determining a serving internet of things device to provide precise positioning information to a mobile device with a network of internet of things devices includes the stages shown. The method 700 is, however, an example and not limiting. The method 700 may be altered, e.g., by having stages added, removed, rearranged, combined, performed concurrently, and/or having single stages split into multiple stages. For example, stages 706 and 708 described below may be performed concurrently. Still other alterations to the method 700 as shown and described are possible.

At stage 702, the method includes obtaining a rough position of a mobile device. The server 402 and the mobile device 602 are a means for obtaining a rough position. In an example, the mobile device 602 includes a SPS receiver 255 configured to receive signals transmitted from the satellites 190. The mobile device 602 may be configured to compute a location locally and provide a rough position to the server 402. In an example, the mobile device 602 provides the satellite measurement information to the server 402 and the server 402 is configured to determine the rough location of the mobile device 602. The rough position of the mobile device 602 may be based on terrestrial navigation techniques such as OTDOA, E-CID, AOA, AOD, RTT, Inertial sensors, or other land based navigation techniques. The rough location may be determined by the communication system 100 and provided to the server 402.

At stage 704, the method includes determining one or more proximate reporting internet of things devices based on the rough position. The server 402 may be a means for determining the one or more proximate reporting devices. Referring to FIG. 6, the server 402 is configured to track the locations of the IoT devices 606, 608a-c, 610a-e as well as other IoT devices which may subsequently join the network. The definition of proximate may be based on the density of IoT devices in the network as well as other operational considerations (e.g., desired accuracy, satellite coverage). In general, proximate reporting IoT devices may be within 10 km of the estimated position of the mobile device 602. In an example, proximate reporting IoT devices may be within 30 km of the mobile device 602. The server 402 is configured to determine a list of IoT devices in the network that are within a threshold distance of the rough location of the mobile device 602. This list of IoT devices is the one or more proximate reporting devices.

At stage 706, the method includes selecting a serving internet of things device from the one or more proximate reporting internet of things devices based on one or more configuration options. The server 402 may be a means for selecting the serving device. The server 402 may include, or have access to, a non-transitory processor-readable storage medium including processor-readable instructions configured to cause one or more processors select the serving device based on the subscription options stored in the data structure 502. In an example, an algorithm may determine a subset of the proximate reporting device that are capable of reporting GNSS measurements and are located at a precise position. For each of the IoT devices in the subset, the algorithm may determine a weighted score based on the parameters of the IoT device as compared to the subscription options for the mobile device 602. The weighted score may be the sum of weighting functions applied to each of the fields in the subscription options. For example, a first weighting function may be a constant value times the distance between the IoT station and the mobile device 602. A second weighting function may be based on the position accuracy field 522 for the mobile device 602 and the device capability of the IoT device. Other weighting functions may be applied to other fields in the subscription options. The computed scores for each of the IoT devices in the subset may be sorted in an array. The IoT device in the subset with the lowest total weighted score may be selected as the serving IoT device 606.

At stage 708, the next n IoT devices in the subset with the next lowest scores may be selected as the hot candidates 608a-c. The server 402 may be configured to periodically execute the algorithm (e.g., every 1, 2, 5, 10, 15, 60 etc. seconds) to ensure the best matching candidate is selected as the serving device and the best hot candidates are identified as the mobile device 602 moves through the network, and as the status of the IoT devices in the network 600 change (e.g., due to movement, power settings, position accuracy, device performance, etc.). The method 700 provides an adaptive precise position service which helps to ensure the delivered precise positioning data matches the subscription options associated with the mobile device.

Figure 8:
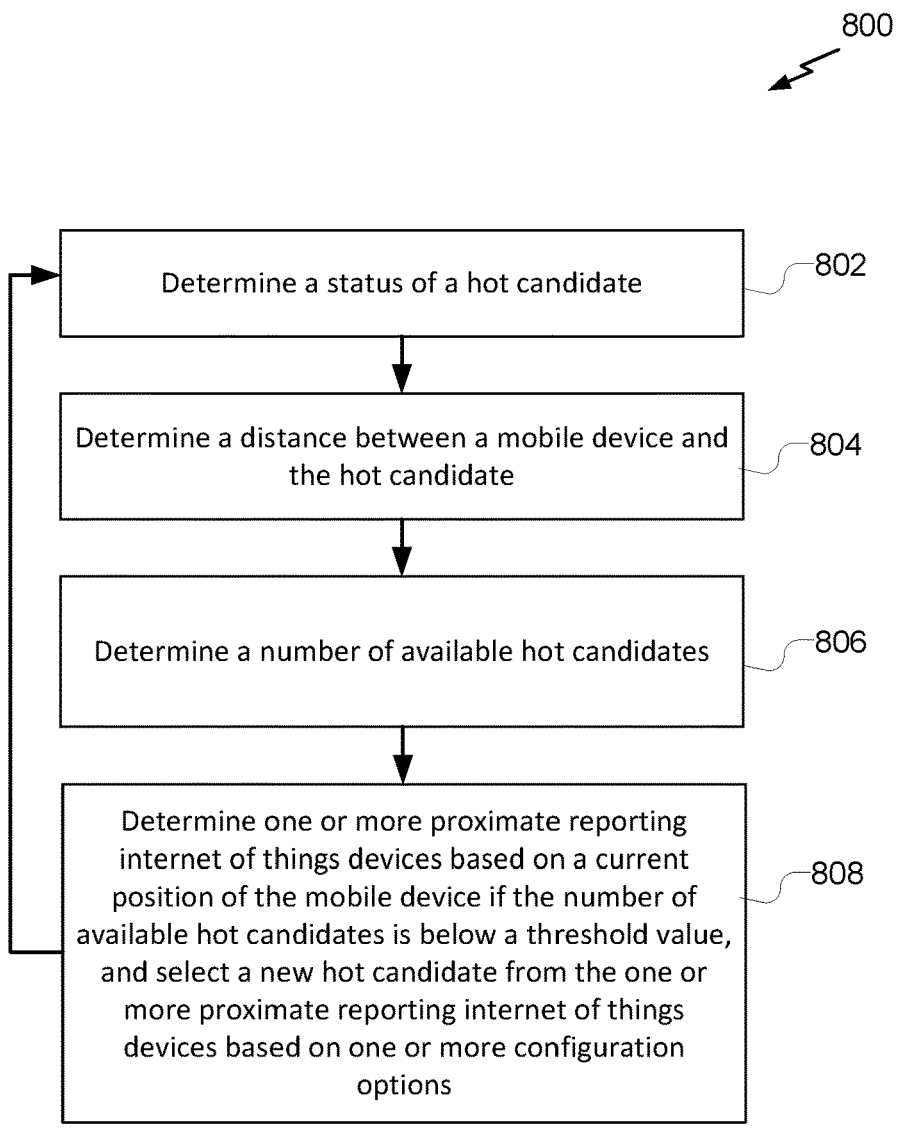
FIG. 8 is a flowchart of an example procedure for tracking one or more hot candidates in an IoT network.

Referring to FIG. 8, with further reference to FIGS. 1-7, a method 800 for tracking one or more hot candidates in an IoT network includes the stages shown. The method 800 is, however, an example and not limiting. The method 800 may be altered, e.g., by having stages added, removed, rearranged, combined, performed concurrently, and/or having single stages split into multiple stages. For example, stages 802, 804 and 806 described below may be performed concurrently. Still other alterations to the method 800 as shown and described are possible.

At stage 802, the method includes determining a status of a hot candidate. The server 402 is a means for determining the status of a hot candidate. The hot candidates 608a-c are identified to become a serving device in the event the current serving IoT device 606 becomes unavailable. The status of each of the hot candidates 608a-c may be periodically evaluated (e.g., every, 0.5, 1, 2, 10, 60, etc. seconds) to ensure they will be available to fulfill the role of a serving device. In an example, the server 402 may send a request to a device to obtain permission to use the device in the network 600. The server may deny such a request and the device would not be added to the network 600. In an example, the request may be sent periodically. Status changes such as dropping offline (e.g., due to power settings), changes in position accuracy (e.g., due to movement), satellite reception (e.g., which may be degraded do to a blocked line of site), or deny a request to join the network may cause a device to be excluded from the network. If a hot candidate becomes unavailable because it goes offline or loses satellite detection capabilities, the device may be removed from the network and/or a status field indicating that device is a hot candidate may be changed.

At stage 804, the method includes determining a distance between a mobile device the hot candidate. The server 402 may be a means for determining the distance. The precise position of the mobile device 602 may be based on the precise positioning data provided by the serving IoT device 606. The server 402 is configured to determine the distance between the mobile device 602 and a current hot candidate. If the distance is greater than a threshold value (e.g., 1, 5, 10, 30 km), the current hot candidate is dropped from the list of hot candidates. At stage 806, the server 402 is configured to determine the number of IoT devices that are classified as a hot candidate. For example, the server 402 may perform a count operation based on the value of an IsHotCandidate status field associated with an IoT device.

At stage 808, the method includes determining one or more proximate reporting internet of things devices based on a current position of the mobile device if the number of available hot candidates is below a threshold value, and select a new hot candidate from the one or more proximate reporting internet of things devices based on one or more configuration options. The server 402 is a means for selecting a new hot candidate. A threshold value of hot candidates may be based on the function and capabilities of the mobile device 602. For example, if the mobile device 602 is moving quickly and/or requires centimeter-level precise positioning, the threshold number of hot candidates may be 3 or 4 to ensure a hot candidate will be available quickly should the serving IoT device 606 go offline or drop out of range (i.e., based on the distance to the mobile device). In another example, if the mobile device 602 is stationary or moving slowly, or has less accurate precise positioning requirements (e.g., sub-meter level), then a threshold value with fewer hot candidates (e.g., 1 or 2) may provide satisfactory positioning results. If the number of hot candidates is below the designated threshold value, the server 402 may be configured to execute a search process to select new hot candidates. For example, the method 700 in FIG. 7 may be used to select the hot candidates based on the configuration options associated with the mobile device 602.

Figure 9:
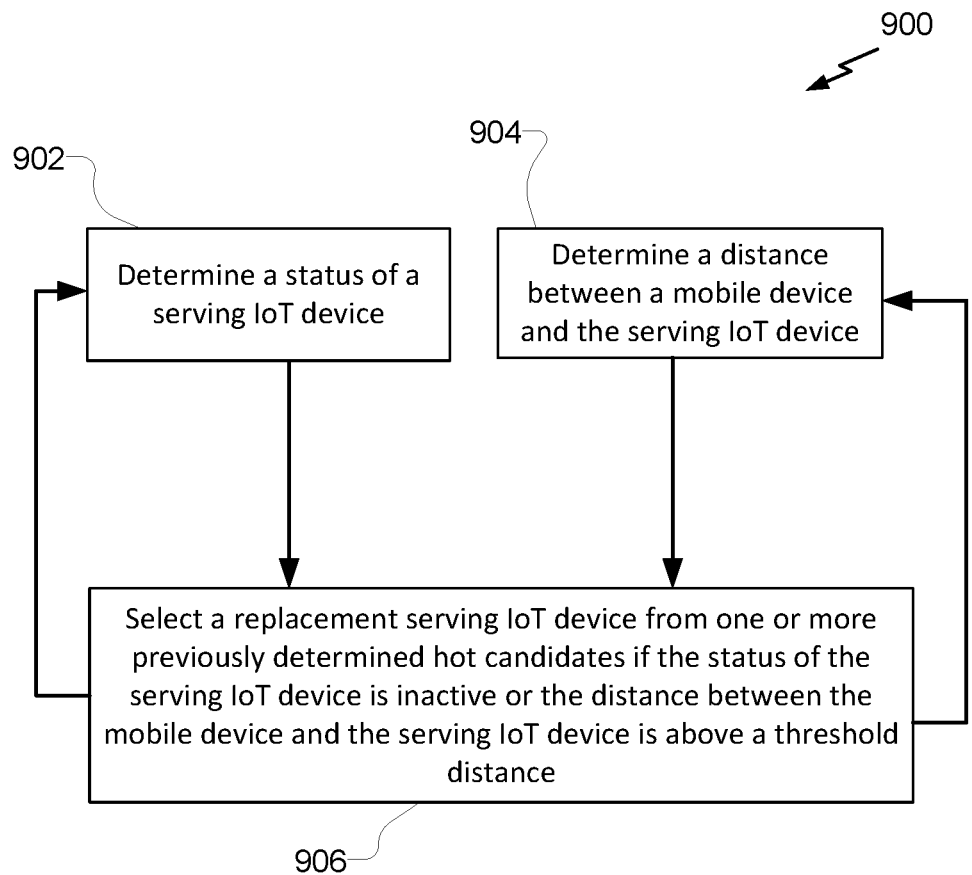
FIG. 9 is a flowchart of an example procedure to track and switch a serving internet of things device in an IoT network.

Referring to FIG. 9, with further reference to FIGS. 1-8, a method 900 to track and switch a serving device in an IoT network includes the stages shown. The method 900 is, however, an example and not limiting. The method 900 may be altered, e.g., by having stages added, removed, rearranged, combined, performed concurrently, and/or having single stages split into multiple stages. For example, stages 902 and 904 described below may be performed concurrently. Still other alterations to the method 900 as shown and described are possible.

At stage 902, the method includes determining a status of a serving internet of things device. The server 402 is a method for determining the status of the serving IoT device. Referring to FIG. 6, the mobile device 602 receives precise positioning data based on the measurements obtained from the serving IoT device 606. If at some point the serving IoT device 606 is unable to provide measurement or correction data to the network 600 (e.g., via the server 402), one of the hot candidates 608a-c may be designated as a new serving IoT device and will provide measurement or correction to the network 600. For example, the serving IoT device 606 may have an inactive status due to a power outage, component failure, or other event which will cause the serving IoT device 606 to lose connection with the network or impair its ability to provide data to the network. The server 402 is configured to maintain a status field for each IoT device in the network 600. If the status of the serving IoT device 606 indicates it is inactive, one of the hot candidates 608a-c will be selected at stage 906.

At stage 904, the method includes determining a distance between a mobile device and the serving IoT device. The server 402 is a means for determining the distance. The precise positions of the mobile device 602 and the serving IoT device 606 are known to the server 402. The distance can be compared to a pre-established threshold value. The threshold value may be based on application parameters such as device speed, accuracy requirements, or other operational factors. In an example, threshold distance values may include 1 km, 5 km, 10 km, 20 km, 30 km, etc.

At stage 906, the method includes selecting a replacement serving IoT device from one or more previously determined hot candidates if the status of the serving IoT device is inactive or the distance between the mobile device and the serving IoT device is above a threshold distance. The server 402 is a means for determining the replacement serving IoT device. Referring to FIG. 7, at stage 708 one or more hot candidates are selected based on the configuration options. The selection of the hot candidates is based on the weighted scored determined in the method 700. The replacement serving device may be the hot candidate with the next best score (i.e., as compared to the serving device selected at stage 706). The replacement serving device may be designated as the serving IoT device and the method 900 may periodically iterate back to stages 902 and 904 (e.g., every 0.5, 1, 2, 5, 10 seconds) to evaluate the status of the serving IoT device as previously described.

Figure 10:
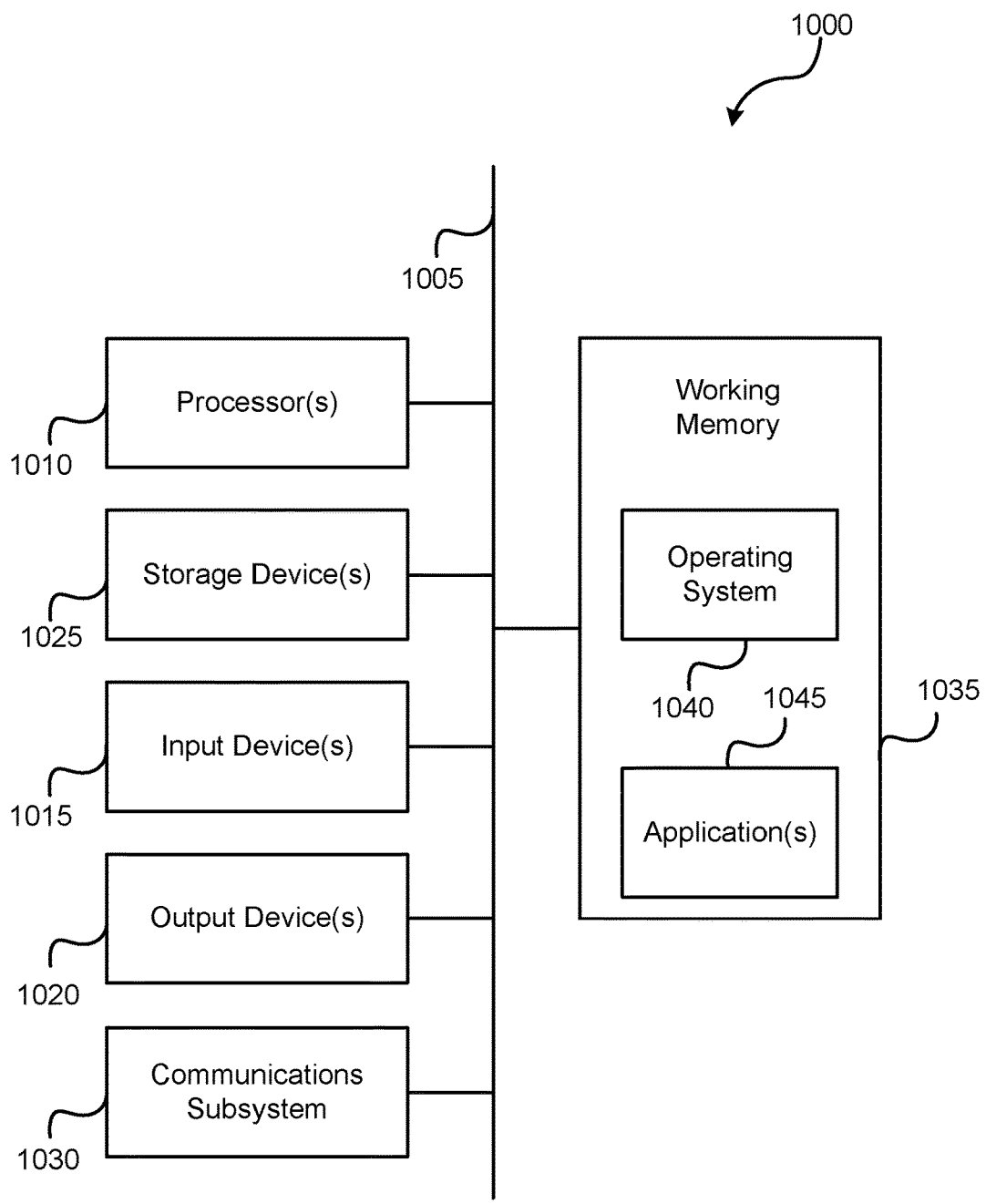
FIG. 10 illustrates a block diagram of an example of a computer system.

A computer system as illustrated in FIG. 10 may incorporate as part of the previously described computerized devices such as the server 402. FIG. 10 provides a schematic illustration of one embodiment of a computer system 1000 that can perform the methods provided by various other embodiments, as described herein. It should be noted that FIG. 10 is meant to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1030 may permit data to be exchanged with a network (such as the network 600, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the disclosure. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the disclosure.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims. Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. An apparatus for determining a precise location of a mobile device, comprising:
    at least one server comprising a data structure containing precise positioning subscription options associated with the mobile device;
    a plurality of client internet of things devices configured to communicate with the at least one server, wherein at least one of the plurality of client internet of things devices is a serving internet of things device configured to provide precise positioning information to the mobile device; and
    wherein the serving internet of things device is selected from the plurality of client internet of things devices based on the precise positioning subscription options.

2. The apparatus of clause 1 wherein the precise positioning subscription options include a desired accuracy of the precise positioning information.

3. The apparatus of clause 1 wherein the precise positioning subscription options include a desired update rate of the precise positioning information.

4. The apparatus of clause 1 wherein the serving internet of things device is configured to provide the precise positioning information to the at least one server, and the at least one server is configured to provide the precise positioning information to the mobile device.

5. The apparatus of clause 1 wherein the precise positioning information is in a radio technical commission for maritime (RTCM) format.

6. The apparatus of clause 1 wherein the precise positioning information is real-time kinematic satellite phase signal correction information.

7. The apparatus of clause 1 wherein the precise positioning information is differential satellite position correction information.

8. The apparatus of clause 1 wherein one or more of the plurality of client internet of things devices are configured as hot candidates based on the precise positioning subscription options, wherein a hot candidate is configured to be a replacement serving internet of things device if the serving internet of things device becomes inactive or a distance between the mobile device and the serving internet of things device exceeds a threshold distance.

9. A method for determining a serving internet of things device to provide precise positioning information to a mobile device with a network of internet of things devices, comprising:
  obtaining a rough position of the mobile device;
  determining one or more proximate reporting internet of things devices based on the rough position;
  selecting the serving internet of things device from the one or more proximate reporting internet of things devices based on one or more configuration options; and
  selecting one or more hot candidates from the one or more proximate reporting internet of things devices based on one or more configuration options.

10. The method of clause 9 wherein the serving internet of things device is configured to provide real-time kinematic satellite phase correction information.

11. The method of clause 9 wherein the serving internet of things device is configured to provide differential satellite correction information.

12. The method of clause 9 wherein the one or more configuration options include a desired accuracy of the precise positioning information.

13. The method of clause 9 wherein the one or more configuration options include a desired update rate of the precise positioning information.

14. The method of clause 9 wherein the serving internet of things device is configured to provide the precise positioning information in a radio technical commission for maritime (RTCM) format.

15. The method of clause 9 further comprising:
  determining a status of the serving internet of things device;
  determining a distance between the mobile device and the serving internet of things device; and
  determining a replacement serving device from the one or more hot candidates if the status of the serving internet of things device is inactive or the distance between the mobile device and the serving internet of things device is above a threshold distance.

16. An apparatus for determining a serving internet of things device to provide precise positioning information to a mobile device with a network of internet of things devices, comprising:
  a memory;
  at least one processor operably coupled to the memory and configured to:
  obtain a rough position of the mobile device;
  determine one or more proximate reporting internet of things devices based on the rough position;
  select the serving internet of things device from the one or more proximate reporting internet of things devices based on one or more configuration options; and
  select one or more hot candidates from the one or more proximate reporting internet of things devices based on one or more configuration options.

17. The apparatus of clause 16 wherein the serving internet of things device is configured to provide real-time kinematic satellite phase correction information.

18. The apparatus of clause 16 wherein the serving internet of things device is configured to provide differential satellite correction information.

19. The apparatus of clause 16 wherein the one or more configuration options include a desired accuracy of the precise positioning information.

20. The apparatus of clause 16 wherein the one or more configuration options include a desired update rate of the precise positioning information.

21. The apparatus of clause 16 wherein the serving internet of things device is configured to provide the precise positioning information in a radio technical commission for maritime (RTCM) format.

22. The apparatus of clause 16 wherein the at least one processor is further configured to:
  determine a status of the serving internet of things device;
  determine a distance between the mobile device and the serving internet of things device; and
  determine a replacement serving device from the one or more hot candidates if the status of the serving internet of things device is inactive or the distance between the mobile device and the serving internet of things device is above a threshold distance.

23. An apparatus for determining a serving internet of things device to provide precise positioning information to a mobile device with a network of internet of things devices, comprising:
  means for obtaining a rough position of the mobile device;
  means for determining one or more proximate reporting internet of things devices based on the rough position;
  means for selecting the serving internet of things device from the one or more proximate reporting internet of things devices based on one or more configuration options; and
  means for selecting one or more hot candidates from the one or more proximate reporting internet of things devices based on one or more configuration options.

24. The apparatus of clause 23 further comprising:
  means for determining a status of the serving internet of things device;
  means for determining a distance between the mobile device and the serving internet of things device; and
  means for determining a replacement serving device from the one or more hot candidates if the status of the serving internet of things device is inactive or the distance between the mobile device and the serving internet of things device is above a threshold distance.

25. A non-transitory processor-readable storage medium comprising processor-readable instructions configured to cause one or more processors to determine a serving internet of things device to provide precise positioning information to a mobile device with a network of internet of things devices, comprising:
  code for obtaining a rough position of the mobile device;
  code for determining one or more proximate reporting internet of things devices based on the rough position;
  code for selecting the serving internet of things device from the one or more proximate reporting internet of things devices based on one or more configuration options; and
  code for selecting one or more hot candidates from the one or more proximate reporting internet of things devices based on one or more configuration options.

26. The non-transitory storage medium of clause 25 further comprising:
  code for determining a status of the serving internet of things device;
  code for determining a distance between the mobile device and the serving internet of things device; and code for determining a replacement serving device from the one or more hot candidates if the status of the serving internet of things device is inactive or the distance between the mobile device and the serving internet of things device is above a threshold distance.

27. A method for switching a serving internet of things device in an internet of things network, comprising:
 determining a status of the serving internet of things device;
 determining a distance between a mobile device and the serving internet of things device; and
 selecting a replacement serving internet of things device from one or more previously determined hot candidates if the status of the serving internet of things device in inactive or the distance between the mobile device and the serving internet of things device is above a threshold distance.

28. The method of clause 27 wherein the one or more previously determined hot candidates is selected from one or more proximate reporting internet of things devices based on one or more configuration options.

29. The method of clause 28 wherein the one or more proximate reporting internet of things devices are within 10 kilometers of the mobile device.

30. The method of clause 28 wherein the one or more configuration options include a desired accuracy of precise positioning information.

31. The method of clause 28 wherein the one or more configuration options include a desired update rate of precise positioning information.

32. An apparatus for switching a serving internet of things device in an internet of things network, comprising:
 a memory;
 at least one processor operably coupled to the memory and configured to:
 determine a status of the serving internet of things device;
 determine a distance between a mobile device and the serving internet of things device; and
 select a replacement serving internet of things device from one or more previously determined hot candidates if the status of the serving internet of things device in inactive or the distance between the mobile device and the serving internet of things device is above a threshold distance.

33. The apparatus of clause 32 wherein the one or more previously determined hot candidates is selected from one or more proximate reporting internet of things devices based on one or more configuration options.

34. The apparatus of clause 33 wherein the one or more proximate reporting internet of things devices are within 10 kilometers of the mobile device.

35. The apparatus of clause 33 wherein the one or more configuration options include a desired accuracy of precise positioning information.

36. The apparatus of clause 33 wherein the one or more configuration options include a desired update rate of precise positioning information.

37. An apparatus for switching a serving internet of things device in an internet of things network, comprising:
 means for determining a status of the serving internet of things device;
 means for determining a distance between a mobile device and the serving internet of things device; and
 means for selecting a replacement serving internet of things device from one or more previously determined hot candidates if the status of the serving internet of things device in inactive or the distance between the mobile device and the serving internet of things device is above a threshold distance.

38. The apparatus of clause 37 wherein the one or more previously determined hot candidates is selected from one or more proximate reporting internet of things devices based on one or more configuration options.

39. The apparatus of clause 38 wherein the one or more proximate reporting internet of things devices are within 10 kilometers of the mobile device.

40. The apparatus of clause 38 wherein the one or more configuration options include a desired accuracy of precise positioning information.

41. The apparatus of clause 38 wherein the one or more configuration options include a desired update rate of precise positioning information.

42. A non-transitory processor-readable storage medium comprising processor-readable instructions configured to cause one or more processors to switch a serving internet of things device in an internet of things network, comprising:
 code for determining a status of the serving internet of things device;
 code for determining a distance between a mobile device and the serving internet of things device; and
 code for selecting a replacement serving internet of things device from one or more previously determined hot candidates if the status of the serving internet of things device in inactive or the distance between the mobile device and the serving internet of things device is above a threshold distance.

43. The non-transitory storage medium of clause 42 wherein the one or more previously determined hot candidates is selected from one or more proximate reporting internet of things devices based on one or more configuration options.

What is claimed is:

1. An apparatus for determining a precise location of a mobile device, comprising:
 at least one server comprising a data structure containing precise positioning subscription options associated with the mobile device, wherein the precise positioning subscription options enable the mobile device to receive customized positioning information selected by the mobile device;
 a plurality of client internet of things devices configured to communicate with the at least one server, wherein at least one of the plurality of client internet of things devices is a serving internet of things device configured to provide precise positioning information to the mobile device based on the precise positioning subscription options; and
 wherein the serving internet of things device is selected from the plurality of client internet of things devices based on the precise positioning subscription options.

2. The apparatus of claim 1 wherein the precise positioning subscription options include a desired accuracy of the precise positioning information.

3. The apparatus of claim 1 wherein the precise positioning subscription options include a desired update rate of the precise positioning information.

4. The apparatus of claim 1 wherein the serving internet of things device is configured to provide the precise positioning information to the at least one server, and the at least one server is configured to provide the precise positioning information to the mobile device.

5. The apparatus of claim 1 wherein the precise positioning information is in a radio technical commission for maritime (RTCM) format.

6. The apparatus of claim 1 wherein the precise positioning information is real-time kinematic satellite phase signal correction information.

7. The apparatus of claim 1 wherein the precise positioning information is differential satellite position correction information.

8. The apparatus of claim 1 wherein one or more of the plurality of client internet of things devices are configured as hot candidates based on the precise positioning subscription options, wherein a hot candidate is configured to be a replacement serving internet of things device if the serving internet of things device becomes inactive or a distance between the mobile device and the serving internet of things device exceeds a threshold distance.

9. The apparatus of claim 1 wherein the at least one server further comprises a billing application configured to provided billing information to a user based on the precise positioning subscription options.

10. A method for determining a serving internet of things device to provide precise positioning information to a mobile device with a network of internet of things devices, comprising:
obtaining a rough position of the mobile device;
determining one or more proximate reporting internet of things devices based on the rough position;
selecting the serving internet of things device from the one or more proximate reporting internet of things devices based on precise positioning subscription options, wherein the precise positioning subscription options enable the mobile device to receive customized positioning information selected by the mobile device; and
selecting one or more hot candidates from the one or more proximate reporting internet of things devices based on the precise positioning subscription options.

11. The method of claim 10 wherein the serving internet of things device is configured to provide real-time kinematic satellite phase correction information.

12. The method of claim 10 wherein the serving internet of things device is configured to provide differential satellite correction information.

13. The method of claim 10 wherein the precise positioning subscription options include a desired accuracy of the precise positioning information.

14. The method of claim 10 wherein the precise positioning subscription options include a desired update rate of the precise positioning information.

15. The method of claim 10 wherein the serving internet of things device is configured to provide the precise positioning information in a radio technical commission for maritime (RTCM) format.

16. The method of claim 10 further comprising:
determining a status of the serving internet of things device;
determining a distance between the mobile device and the serving internet of things device; and
determining a replacement serving device from the one or more hot candidates if the status of the serving internet of things device is inactive or the distance between the mobile device and the serving internet of things device is above a threshold distance.

17. An apparatus for determining a serving internet of things device to provide precise positioning information to a mobile device with a network of internet of things devices, comprising:
a memory;
at least one processor operably coupled to the memory and configured to:
obtain a rough position of the mobile device;
determine one or more proximate reporting internet of things devices based on the rough position;
select the serving internet of things device from the one or more proximate reporting internet of things devices based on precise positioning subscription options, wherein the precise positioning subscription options enable the mobile device to receive customized positioning information selected by the mobile device; and
select one or more hot candidates from the one or more proximate reporting internet of things devices based on the precise positioning subscription options.

18. The apparatus of claim 17 wherein the serving internet of things device is configured to provide real-time kinematic satellite phase correction information.

19. The apparatus of claim 17 wherein the serving internet of things device is configured to provide differential satellite correction information.

20. The apparatus of claim 17 wherein the precise positioning subscription options include a desired accuracy of the precise positioning information.

21. The apparatus of claim 17 wherein the precise positioning subscription options include a desired update rate of the precise positioning information.

22. The apparatus of claim 17 wherein the serving internet of things device is configured to provide the precise positioning information in a radio technical commission for maritime (RTCM) format.

23. The apparatus of claim 17 wherein the at least one processor is further configured to:
determine a status of the serving internet of things device;
determine a distance between the mobile device and the serving internet of things device; and
determine a replacement serving device from the one or more hot candidates if the status of the serving internet of things device is inactive or the distance between the mobile device and the serving internet of things device is above a threshold distance.

24. An apparatus for determining a serving internet of things device to provide precise positioning information to a mobile device with a network of internet of things devices, comprising:
means for obtaining a rough position of the mobile device;
means for determining one or more proximate reporting internet of things devices based on the rough position;
means for selecting the serving internet of things device from the one or more proximate reporting internet of things devices based on precise positioning subscription options, wherein the precise positioning subscription options enable the mobile device to receive customized positioning information selected by the mobile device; and
means for selecting one or more hot candidates from the one or more proximate reporting internet of things devices based on the precise positioning subscription options.

25. The apparatus of claim 24 further comprising:
means for determining a status of the serving internet of things device;
means for determining a distance between the mobile device and the serving internet of things device; and
means for determining a replacement serving device from the one or more hot candidates if the status of the serving internet of things device is inactive or the distance between the mobile device and the serving internet of things device is above a threshold distance.

26. A non-transitory processor-readable storage medium comprising processor-readable instructions configured to cause one or more processors to determine a serving internet of things device to provide precise positioning information to a mobile device with a network of internet of things devices, comprising:
code for obtaining a rough position of the mobile device;
code for determining one or more proximate reporting internet of things devices based on the rough position;
code for selecting the serving internet of things device from the one or more proximate reporting internet of things devices based on precise positioning subscription options, wherein the precise positioning subscription options enable the mobile device to receive customized positioning information selected by the mobile device; and
code for selecting one or more hot candidates from the one or more proximate reporting internet of things devices based on the precise positioning subscription options.

27. The non-transitory storage medium of claim 26 further comprising:
code for determining a status of the serving internet of things device;
code for determining a distance between the mobile device and the serving internet of things device; and
code for determining a replacement serving device from the one or more hot candidates if the status of the serving internet of things device is inactive or the distance between the mobile device and the serving internet of things device is above a threshold distance.

28. A method for switching a serving internet of things device in an internet of things network, comprising:
determining a status of the serving internet of things device;
determining a distance between a mobile device and the serving internet of things device; and
selecting a replacement serving internet of things device from one or more previously determined hot candidates if the status of the serving internet of things device is inactive or the distance between the mobile device and the serving internet of things device is above a threshold distance.

29. The method of claim 28 wherein the one or more previously determined hot candidates is selected from one or more proximate reporting internet of things devices based on one or more configuration options.

30. The method of claim 29 wherein the one or more proximate reporting internet of things devices are within 10 kilometers of the mobile device.

31. The method of claim 29 wherein the one or more configuration options include a desired accuracy of precise positioning information.

32. The method of claim 29 wherein the one or more configuration options include a desired update rate of precise positioning information.

33. An apparatus for switching a serving internet of things device in an internet of things network, comprising:
a memory;
at least one processor operably coupled to the memory and configured to:
determine a status of the serving internet of things device;
determine a distance between a mobile device and the serving internet of things device; and
select a replacement serving internet of things device from one or more previously determined hot candidates if the status of the serving internet of things device is inactive or the distance between the mobile device and the serving internet of things device is above a threshold distance.

34. The apparatus of claim 33 wherein the one or more previously determined hot candidates is selected from one or more proximate reporting internet of things devices based on one or more configuration options.

35. The apparatus of claim 34 wherein the one or more proximate reporting internet of things devices are within 10 kilometers of the mobile device.

36. The apparatus of claim 34 wherein the one or more configuration options include a desired accuracy of precise positioning information.

37. The apparatus of claim 34 wherein the one or more configuration options include a desired update rate of precise positioning information.

38. An apparatus for switching a serving internet of things device in an internet of things network, comprising:
means for determining a status of the serving internet of things device;
means for determining a distance between a mobile device and the serving internet of things device; and
means for selecting a replacement serving internet of things device from one or more previously determined hot candidates if the status of the serving internet of things device is inactive or the distance between the mobile device and the serving internet of things device is above a threshold distance.

39. The apparatus of claim 38 wherein the one or more previously determined hot candidates is selected from one or more proximate reporting internet of things devices based on one or more configuration options.

40. The apparatus of claim 39 wherein the one or more proximate reporting internet of things devices are within 10 kilometers of the mobile device.

41. The apparatus of claim 39 wherein the one or more configuration options include a desired accuracy of precise positioning information.

42. The apparatus of claim 39 wherein the one or more configuration options include a desired update rate of precise positioning information.

43. A non-transitory processor-readable storage medium comprising processor-readable instructions configured to cause one or more processors to switch a serving internet of things device in an internet of things network, comprising:
code for determining a status of the serving internet of things device;
code for determining a distance between a mobile device and the serving internet of things device; and
code for selecting a replacement serving internet of things device from one or more previously determined hot candidates if the status of the serving internet of things device is inactive or the distance between the mobile device and the serving internet of things device is above a threshold distance.

44. The non-transitory storage medium of claim 43 wherein the one or more previously determined hot candidates is selected from one or more proximate reporting internet of things devices based on one or more configuration options.

* * * * *